(12) United States Patent
Pyles et al.

(10) Patent No.: US 10,737,468 B2
(45) Date of Patent: Aug. 11, 2020

(54) HIGH SECURITY POLYCARBONATE LAMINATE WINDOWS WITH INSULATED GLAZING UNITS

(71) Applicant: PLASKOLITE MASSACHUSETTS, LLC, Columbus, OH (US)

(72) Inventors: Robert A. Pyles, Bethel Park, PA (US); Jessica Boyer, Coraopolis, PA (US); Isaac Platte, Pittsburgh, PA (US); David Rocco, Bridgeville, PA (US)

(73) Assignee: Plaskolite Massachusetts, LLC, Columbus, OH (US)

( * ) Notice: Subject to any disclaimer, the term of this patent is extended or adjusted under 35 U.S.C. 154(b) by 328 days.

(21) Appl. No.: 15/337,126

(22) Filed: Oct. 28, 2016

(65) Prior Publication Data

US 2018/0117881 A1 May 3, 2018

(51) Int. Cl.
*B32B 7/02* (2019.01)
*B32B 17/06* (2006.01)
(Continued)

(52) U.S. Cl.
CPC .............. *B32B 17/064* (2013.01); *B32B 7/12* (2013.01); *B32B 17/10064* (2013.01);
(Continued)

(58) Field of Classification Search
CPC . B32B 27/365; B32B 17/064; B32B 2250/05; B32B 2307/304;
(Continued)

(56) References Cited

U.S. PATENT DOCUMENTS 2,991,273 A 7/1961 Hechelhammer et al.
2,999,835 A 9/1961 Goldberg
(Continued)

FOREIGN PATENT DOCUMENTS

CN 104416983 A 3/2015
DE 2036052 A1 1/1972
(Continued)

OTHER PUBLICATIONS

"Gas Space Convection Effects on U-Values in Insulating Glass Units", PPG Glass Technology, Nov. 27, 2001.*
(Continued)

*Primary Examiner* — Maria V Ewald
*Assistant Examiner* — Zachary M Davis
(74) *Attorney, Agent, or Firm* — Vorys, Sater, Seymour and Pease LLP (57) ABSTRACT

The present invention provides high security polycarbonate laminates integrated with insulated glazing units (IGU) to produce high security windows. The laminate comprises at least nine layers, in the following order: (i) an insulated glazing unit; (ii) a thermoplastic polyurethane; (iii) a polycarbonate; (iv) a thermoplastic polyurethane; (v) a polycarbonate; (vi) a thermoplastic polyurethane; (vii) a glass; (viii) a thermoplastic polyurethane; and (ix) a polycarbonate. A frame may surround and overbite the laminate. An array of framed laminates may be arranged such that one framed laminate may be removed, without removing an adjacent laminate.

20 Claims, 2 Drawing Sheets

(51) Int. Cl.
  *B32B 17/10* (2006.01)
  *F41H 5/04* (2006.01)
  *B32B 7/12* (2006.01)
  *B32B 27/36* (2006.01)
  *B32B 27/40* (2006.01)
  *E06B 3/67* (2006.01)
  *E06B 5/11* (2006.01)
  *E06B 5/12* (2006.01)

(52) U.S. Cl.
  CPC .... *B32B 17/1077* (2013.01); *B32B 17/10174* (2013.01); *B32B 27/365* (2013.01); *B32B 27/40* (2013.01); *E06B 3/6715* (2013.01); *E06B 5/11* (2013.01); *E06B 5/12* (2013.01); *F41H 5/0407* (2013.01); *B32B 2250/05* (2013.01); *B32B 2307/304* (2013.01); *B32B 2369/00* (2013.01); *B32B 2419/00* (2013.01)

(58) Field of Classification Search
  CPC ........ B32B 2301/212; B32B 17/10009; B32B 17/17; B32B 17/10027; B32B 17/10067; B32B 17/10073; E06B 3/6715; E06B 3/6612; E06B 5/106; E06B 5/12; F41H 5/0407
  See application file for complete search history.

(56) References Cited

U.S. PATENT DOCUMENTS

| | | | |
|---|---|---|---|
| 2,999,846 | A | 9/1961 | Schnell |
| 3,148,172 | A | 9/1964 | Fox |
| 3,271,367 | A | 9/1966 | Schnell et al. |
| 4,556,600 | A | 12/1985 | Kraemling et al. |
| 4,861,666 | A | 8/1989 | LeGrand et al. |
| 4,982,014 | A | 1/1991 | Freitag et al. |
| 5,097,002 | A | 3/1992 | Sakashita et al. |
| 5,340,905 | A | 8/1994 | Steffen et al. |
| 5,496,643 | A | 3/1996 | Von Alpen |
| 5,567,258 | A | 10/1996 | Lee et al. |
| 5,717,057 | A | 2/1998 | Sakashita et al. |
| 6,518,389 | B1 | 2/2003 | Kaufhold et al. |
| 6,596,840 | B1 | 7/2003 | Kratschmer et al. |
| 7,003,920 | B1 | 2/2006 | Messere et al. |
| 7,491,440 | B2 | 2/2009 | Fukatani et al. |
| 7,541,076 | B2 | 6/2009 | Landon |
| 7,833,916 | B2 | 11/2010 | Leeser et al. |
| 8,343,571 | B2 | 1/2013 | Werners et al. |
| 2003/0061783 | A1* | 4/2003 | Duncan ............ B32B 17/10018 52/745.19 |
| 2004/0158026 | A1 | 8/2004 | Kauth et al. |
| 2009/0241422 | A1* | 10/2009 | Mock .................... E06B 3/5892 49/197 |
| 2010/0024692 | A1 | 2/2010 | Bar |
| 2011/0223414 | A1* | 9/2011 | Higuchi .................. B32B 27/08 428/334 |
| 2012/0219749 | A1* | 8/2012 | Leighton ................ B32B 18/00 428/76 |
| 2012/0297964 | A1* | 11/2012 | Carberry ............... F41H 5/0407 89/36.02 |
| 2013/0078460 | A1 | 3/2013 | Tasaka et al. |
| 2013/0164493 | A1 | 6/2013 | Hirai |
| 2013/0330570 | A1* | 12/2013 | Michiels .................. B32B 7/12 428/624 |
| 2014/0186556 | A1* | 7/2014 | Dear .................... E06B 3/26345 428/34 |
| 2015/0370140 | A1 | 12/2015 | Bertolini |
| 2015/0377595 | A1* | 12/2015 | Scarinci ................ F41H 5/0407 89/36.02 |

FOREIGN PATENT DOCUMENTS

| | | |
|---|---|---|
| DE | 2754684 B1 | 6/1979 |
| DE | 3832396 A1 | 2/1990 |
| FR | 2808473 A1 | 11/2001 |
| GB | 1122003 A | 7/1968 |
| GB | 1341318 A | 12/1973 |
| GB | 1367790 A | 9/1974 |
| JP | 2000105867 A | 4/2000 |
| NO | 2013053611 A1 | 4/2013 |

OTHER PUBLICATIONS

H. Schnell, Chemistry and Physics of Polycarbonates, Interscience Publishers, New York, 1964, p. 28 ff.
D. G. Legrand, J. T. Bendier, Handbook of Polycarbonate Science and Technology, Marcel Dekker New York 2000, p. 72 ff.

* cited by examiner

HIGH SECURITY POLYCARBONATE LAMINATE WINDOWS WITH INSULATED GLAZING UNITS

FIELD OF THE INVENTION

The present invention relates to high security polycarbonate laminates integrated with insulated glazing units (IGU) to produce high security windows.

SUMMARY OF THE INVENTION

The present invention is a laminate comprising nine layers, in the following order: (i) an insulated glazing unit; (ii) a thermoplastic polyurethane; (iii) a polycarbonate; (iv) a thermoplastic polyurethane; (v) a polycarbonate; (vi) a thermoplastic polyurethane; (vii) a glass; (viii) a thermoplastic polyurethane; and (ix) a polycarbonate.

In an embodiment of the invention, the insulated glazing unit is comprised of a glass layer, an insulating layer, and a second glass layer. In another embodiment, the insulated glazing unit is comprised of a glass layer, a signal defense layer, a second glass layer, an insulating layer, and a third glass layer. In each of these embodiments, the insulating layer may comprise air, nitrogen or argon. In addition, the insulating layer may comprise gas at a pressure lower than atmospheric pressure.

In another embodiment of the invention, the thermoplastic polyurethane layers are about 0.025 inches (0.635 mm) to about 0.125 inches (3.175 mm) in thickness. In still another embodiment, the polycarbonate layers are about 0.125 inches (3.175 mm) to about 0.5 inches (12.7 mm) in thickness. In yet another embodiment, the glass layer is about 0.25 inches (6.35 mm) to about 0.375 inches (9.53 mm) in thickness.

In an embodiment not yet mentioned, the polycarbonate has a molecular weight of 10,000 g/mol-200,000 g/mol. In still another, the polycarbonate has a molecular weight of 20,000 g/mol-80,000 g/mol, and in yet another the polycarbonate has a molecular weight of 30,000 g/mol-32,000 g/mol.

In another embodiment of the invention, the thickness of the laminate is between 2 and 4 inches (5.08 cm-10.16 cm), and in another, the thickness of the laminate is between 2.4 and 3 inches (6.1 cm and 7.62 cm).

Another embodiment of the invention is a framed laminate, comprising a frame and a laminate described above, wherein the frame substantially surrounds the laminate. The framed laminate may overlap the laminate in a frame bite of 0.75 inches (1.9 cm) to 3 inches (7.6 cm), or 1 inch (2.5 cm) to 2 inches (5.1 cm). In addition, the framed laminate, may further comprise an adhesive disposed in between the frame and the laminate.

Still another embodiment is an array of two or more framed laminates described above, comprising a first framed laminate and a second framed laminate, wherein the first framed laminate is adjacent to the second framed laminate, and wherein the first framed laminate may be removed without removing the second framed laminate.

BRIEF DESCRIPTION OF THE FIGURES

The present invention will now be described for purposes of illustration and not limitation in conjunction with the figures, wherein:

FIG. 2 shows two layers of glass with a signal defense layer in between;

DESCRIPTION OF THE INVENTION

Polycarbonate laminates are used in conjunction with insulated glazing units, to provide a substantially transparent window that has several benefits. The window insulates against cold and hot weather, provides blast and ballistics resistance, and may further provide a shield against unwanted radio or electronic signals. Moreover, the polycarbonate laminates are designed to not only withstand a blast impact, but is also designed in such a way, that its layers do not deform or peel away from each other through their bonding process or changes in outside temperature and over time, even when using materials that expand and contract differently in the cold and heat (otherwise known as differences in coefficients of thermal expansion). Accordingly, the polycarbonate laminates are likewise able to withstand changes in temperature that may accompany both its lamination and environmental conditions in which it must operate. The panels are transparent, or substantially transparent, and may appear as a normal window from the exterior of the building.

Insulated glazing units (or IGUs) are well known in windows today, and are a standard in home and in commercial office buildings throughout the world. IGUs often include two (2) panes of glass, with an insulating layer in between them. The insulating layer may be a clear, inert gas such as air, nitrogen, argon or other inert gas. In addition, the insulating layer may be produced using a vacuum, such that the gas inside has a reduced pressure, so it may act as a better thermal insulator. Preferably the glass is annealed.

The IGU may further comprise a coating on a glass layer surface facing the insulating layer. This coating reflects infrared radiation found as a component of sunlight, reducing solar heat gain and thermal heating of building interiors in summer and reducing heat losses from the interiors in winter. Such low emissivity (or low-e) coatings are commercially available from, for example, PPG under the trade name Solarban 70XL.

IGUs may also include a signal defense layer. Such signal defense layers may be films, also known as cyber films, that reject radio frequency (RF), infra-red (IR) and sometimes ultra-violet (UV) signals, and thus prevent eavesdropping and the theft of electronic information. Cyber films, for example SD 1000 and SD 2500, are commercially available from Signal Defense, LLC, of Owings Mills, Md.

The panels of the present invention comprise polycarbonate sheets. Suitable polycarbonate resins for preparing the sheets useful in constructing panels of the present invention are homopolycarbonates and copolycarbonates, both linear or branched resins and mixtures thereof. The polycarbonates have a weight average molecular weight of preferably 10,000 to 200,000 g/mol, more preferably 20,000 to 80,000 g/mol and most preferably 30,000 to 32,000 g/mol.

Polycarbonates in the context of the present invention are either homopolycarbonates or copolycarbonates and/or polyestercarbonates; the polycarbonates may, in a known manner, be linear or branched. According to the invention, it is also possible to use mixtures of polycarbonates.

A portion of up to 80 mol %, preferably of 20 mol % up to 50 mol %, of the carbonate groups in the polycarbonates used in accordance with the invention may be replaced by aromatic dicarboxylic ester groups. Polycarbonates of this kind, incorporating both acid radicals from the carbonic acid and acid radicals from aromatic dicarboxylic acids in the molecule chain, are referred to as aromatic polyestercarbonates. In the context of the present invention, they are encompassed by the umbrella term of the thermoplastic aromatic polycarbonates.

The polycarbonates are prepared in a known manner from bishydroxyaryl compounds, carbonic acid derivatives, optionally chain terminators and optionally branching agents, with preparation of the polyestercarbonates by replacing a portion of the carbonic acid derivatives with aromatic dicarboxylic acids or derivatives of the dicarboxylic acids, according to the carbonate structural units to be replaced in the aromatic polycarbonates by aromatic dicarboxylic ester structural units.

Dihydroxyaryl compounds suitable for the preparation of polycarbonates are those of the formula (2)

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (2) is a radical of the formula (3)

in which $R^6$ and $R^7$ are each independently H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, $-SO_2-$, $-CO-$, $-O-$, $-S-$, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else $C_6$- to $C_{12}$-arylene which may optionally be fused to further aromatic rings containing heteroatoms.

Preferably, X is a single bond, $C_1$- to $C_5$-alkylene, $C_2$- to $C_5$-alkylidene, $C_5$- to $C_6$-cycloalkylidene, $-O-$, $-SO-$, $-CO-$, $-S-$, $-SO_2-$ or a radical of the formula (3a)

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes and the ring-alkylated and ring-halogenated compounds thereof.

Examples of bishydroxyaryl compounds suitable for the preparation of the polycarbonates for use in accordance with the invention include hydroquinone, resorcinol, dihydroxydiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes and the alkylated, ring-alkylated and ring-halogenated compounds thereof.

Preferred bishydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred bishydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and further suitable bishydroxyaryl compounds are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendier, Handbook of Polycarbonate Science and Technology, Marcel Dekker New York 2000, p. 72 ff."

Only one bishydroxyaryl compound is used in the case of the homopolycarbonates; two or more bishydroxyaryl compounds are used in the case of copolycarbonates. The bishydroxyaryl compounds employed, similarly to all other chemicals and assistants added to the synthesis, may be contaminated with the contaminants from their own synthesis, handling and storage. However, it is desirable to employ the purest possible raw materials.

The monofunctional chain terminators needed to regulate the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction together with the bisphenoxide(s) or else added to the synthesis at any time, provided that phosgene or chlorocarbonic acid end groups are still present in the reaction mixture, or, in the case of the acid chlorides and chlorocarbonic esters as chain terminators, provided that sufficient phenolic end groups of the polymer being formed are available. Preferably, the chain terminator(s), however, is/are added after the phosgenation at a site or at a time when no phosgene is present any longer but the catalyst has still not been metered in, or are metered in prior to the catalyst, together with the catalyst or in parallel.

Any branching agents or branching agent mixtures to be used are added to the synthesis in the same manner, but typically before the chain terminators. Typically, trisphenols, quaterphenols or acid chlorides of tri- or tetracarboxylic acids are used, or else mixtures of the polyphenols or of the acid chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri-(4-hydroxyphenyl)heptane, 1,3,5-tris(4-hydroxyphenyl) benzene, 1,1,1-tri-(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, again based on moles of bishydroxyaryl compounds used in each case.

The branching agents can either be initially charged together with the bishydroxyaryl compounds and the chain terminators in the aqueous alkaline phase or added dissolved in an organic solvent prior to the phosgenation.

All these measures for preparation of the polycarbonates are familiar to those skilled in the art.

Aromatic dicarboxylic acids suitable for the preparation of the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the dicarbonyl dihalides and the dialkyl dicarboxylates, especially the dicarbonyl dichlorides and the dimethyl dicarboxylates.

The replacement of the carbonate groups by the aromatic dicarboxylic ester groups proceeds essentially stoichiometrically and also quantitatively, and so the molar ratio of the co-reactants is reflected in the final polyester carbonate. The aromatic dicarboxylic ester groups can be incorporated either randomly or in blocks.

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the first case, the acid derivatives used are preferably phosgene and optionally dicarbonyl dichlorides; in the latter case, they are preferably diphenyl carbonate and optionally dicarboxylic diesters. Catalysts, solvents, workup, reaction conditions etc. for the polycarbonate preparation or polyestercarbonate preparation have been described and are known to a sufficient degree in both cases.

Suitable polycarbonate resins are available in commerce, for instance, from Covestro LLC, Pittsburgh, Pa., under the MAKROLON trademark. In one embodiment, polycarbonate having a high molecular weight is used; in this or in another embodiment a polycarbonate or polycarbonate blend is used that has a low amount of additives, or even none at all. Examples of such polycarbonates include those having molecular weights in the range of 25,000 to 36,000 g/mol, preferably 28,000 to 34,000 g/mol and most preferably 30,000 to 32,000 g/mol, as determined by GPC as described below. One such brand is Makrolon© 3100, sold by Covestro LLC, of Pittsburgh, Pa.

The technique employed to determine the molecular weight of polycarbonate is gel-permeation chromatography (GPC) using polystyrene calibration standards. A Waters Alliance 2695 GPC with refractive index (RI) detection is employed for these analyses. The GPC is controlled, data collected, and data analyzed by Waters Empower chromatography software. The columns employed include three 30 cm SDVB PL Gel Mixed E columns with a 5 μm 2-Mixed D guard column. The mobile phase is tetrahydrofuran (THF). Toluene is used for elution-time correction. The flow rate is 1.0 mL/min. at 35° C., with a run-time of 40 min. Polystyrene calibration standards are used as primary calibrators and CD-2000, 2450 and 3400 are employed as secondary standards. The sample injection volume is 75 μL with a sample concentration of 2.5 mg/mL.

Aliphatic thermoplastic polyurethanes are particularly preferred in the laminates of the present invention such as those prepared according to U.S. Pat. No. 6,518,389, the entire contents of which are incorporated herein by reference.

Thermoplastic polyurethane elastomers are well known to those skilled in the art. They are of commercial importance due to their combination of high-grade mechanical properties with the known advantages of cost-effective thermoplastic processability and aliphatic thermoplastic polyurethanes are weather resistant (i.e., resistant to yellowing from UV-radiation exposure produced by the sun). Aliphatic thermoplastic polyurethanes are thus ideal for manufacturing laminates exposed to sunlight. A wide range of variation in their mechanical properties can be achieved by the use of different chemical synthesis components. A review of thermoplastic polyurethanes, their properties and applications is given in Kunststoffe [Plastics] 68 (1978), pages 819 to 825, and in Kautschuk, Gummi, Kunststoffe [Natural and Vulcanized Rubber and Plastics] 35 (1982), pages 568 to 584.

Thermoplastic polyurethanes are synthesized from linear polyols, mainly polyester diols or polyether diols, organic diisocyanates and short chain diols (chain extenders). Catalysts may be added to the reaction to speed up the reaction of the components.

The relative amounts of the components may be varied over a wide range of molar ratios in order to adjust the properties. Molar ratios of polyols to chain extenders from 1:1 to 1:12 have been reported. These result in products with hardness values ranging from 80 Shore A to 75 Shore D.

Thermoplastic polyurethanes can be produced either in stages (prepolymer method) or by the simultaneous reaction of all the components in one step (one shot). In the former, a prepolymer formed from the polyol and diisocyanate is first formed and then reacted with the chain extender. Thermoplastic polyurethanes may be produced continuously or batch-wise. The best-known industrial production processes are the so-called belt process and the extruder process.

Examples of the suitable polyols include difunctional polyether polyols, polyester polyols, and polycarbonate polyols. Small amounts of trifunctional polyols may be used, yet care must be taken to make certain that the thermoplasticity of the thermoplastic polyurethane remains substantially un-effected.

Suitable polyester polyols include those which are prepared by polymerizing ε-caprolactone using an initiator such as ethylene glycol, ethanolamine and the like. Further suitable examples are those prepared by esterification of polycarboxylic acids. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; (1,4-bis-hydroxy-methylcyclohexane); 2-methyl-1,3-propanediol; 2,2,4-tri-methyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane.

Suitable polyisocyanates for producing the thermoplastic polyurethanes useful in the laminates of the present invention may be, for example, organic aliphatic diisocyanates including, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, and mixtures thereof.

Preferred chain extenders with molecular weights of 62 to 500 include aliphatic diols containing 2 to 14 carbon atoms, such as ethanediol, 1,6-hexanediol, diethylene glycol, dipropylene glycol, and 1,4-butanediol in particular, for example. However, diesters of terephthalic acid with glycols containing 2 to 4 carbon atoms are also suitable, such as terephthalic acid-bis-ethylene glycol or -1,4-butanediol for example, or hydroxyalkyl ethers of hydroquinone, such as 1,4-di-(β-hydroxyethyl)-hydroquinone for example, or (cyclo)aliphatic diamines, such as isophorone diamine, 1,2- and 1,3-propylenediamine, N-methyl-propylenediamine-1,3 or N,N'-dimethyl-ethylenediamine, for example, and aromatic diamines, such as toluene 2,4- and 2,6-diamines, 3,5-diethyltoluene 2,4- and/or 2,6-diamine, and primary ortho-, di-, tri- and/or tetraalkyl-substituted 4,4'-diaminodiphenylmethanes, for example. Mixtures of the aforementioned chain extenders may also be used. Optionally, triol chain extenders having a molecular weight of 62 to 500 may also be used. Moreover, customary monofunctional compounds may also be used in small amounts, e.g., as chain terminators or demolding agents. Alcohols such as octanol and stearyl alcohol or amines such as butylamine and stearylamine may be cited as examples.

To prepare the thermoplastic polyurethanes, the synthesis components may be reacted, optionally in the presence of catalysts, auxiliary agents and/or additives, in amounts such that the equivalent ratio of NCO groups to the sum of the groups which react with NCO, particularly the OH groups of the low molecular weight diols/triols and polyols, is 0.9:1.0 to 1.2:1.0, preferably 0.95:1.0 to 1.10:1.0.

Suitable catalysts include tertiary amines which are known in the art, such as triethylamine, dimethyl-cyclohexylamine, N-methylmorpholine, N,N'-dimethyl-piperazine, 2-(dimethyl-aminoethoxy)-ethanol, diazabicyclo-(2,2,2)-octane and the like, for example, as well as organic metal compounds in particular, such as titanic acid esters, iron compounds, tin compounds, e.g., tin diacetate, tin dioctoate, tin dilaurate or the dialkyltin salts of aliphatic carboxylic acids such as dibutyltin diacetate, dibutyltin dilaurate or the like. The preferred catalysts are organic metal compounds, particularly titanic acid esters and iron and/or tin compounds.

In addition to difunctional chain extenders, small quantities of up to about 5 mol. percent, based on moles of the bifunctional chain extender used, of trifunctional or more than trifunctional chain extenders may also be used.

Trifunctional or more than trifunctional chain extenders of the type in question are, for example, glycerol, trimethylolpropane, hexanetriol, pentaerythritol and triethanolamine.

Many commercially available polyurethanes are available and suitable for use in the invention. Suitable aliphatic ester-based thermoplastic polyurethanes are available, for example, from Covestro LLC of Pittsburgh, Pa. under the TEXIN trademark, or from Lubrizol Advanced Materials, Inc. of Brecksville, Ohio under the ESTANE trademark, including Estane AG8451 and Estane AG8320. Still further, similar polyurethanes are available from Deerfield Urethane, Inc. of Whately, Mass. (a Covestro company) under the trade designations Deerfield Urethane A4700 and Deerfield Urethane A4100. Polyester-based aliphatic polyurethanes are also suitable for use in the invention. The thermoplastic polyurethanes are preferably used in the present invention in the form of films or sheets.

The polycarbonate laminate includes an insulated glazing unit (IGU), a thermoplastic polyurethane (TPU) layer, a polycarbonate (PC) layer, a TPU layer, a PC layer, a TPU layer, a glass layer, a TPU layer, and a PC layer. In addition, the polycarbonate laminate may further include a hard coat applied to the exterior surface facing the office space, to permit cleaning without scratching and chemical attack. The IGU side of the laminate will typically be placed facing the outside environment, as that side is subject to high temperature fluctuations, and the IGU will serve to insulate the TPU and PC layers from dramatic temperature variations and the interior of the building to help conserve building energy. TPU layers are placed in between PC and glass, glass and glass, and PC and PC layers as the TPU adheres to each, and allows for the layers to remain bonded together even after expanding or contracting due to temperature changes. Also, the TPU and PC layers will expand and contract more than the glass layers, and if the difference in expansion or contraction is too great, then the layers of the laminate may pull apart from one another, a process known as delamination. The TPU thickness may be adjusted to insure delamination due to thermal expansion and contraction does not occur. The TPU thickness may be determined by computer software modeling. In addition, a TPU layer thickness should be selected that minimize stresses in the overall laminate structure.

The thermoplastic polyurethane layers of the laminate are preferably about 0.025 inches (0.635 mm) to about 0.125 inches (3.175 mm) in thickness. The polycarbonate layers are preferably about 0.125 inches (3.175 mm) to about 0.5 inches (12.7 mm) in thickness, and the glass layer is preferably about 0.25 inches (6.35 mm) to about 0.375 inches (9.53 mm) in thickness. In addition, the total thickness of the laminate is preferably between 2 and 4 inches (5.08 cm-10.16 cm), more preferably between 2.4 and 3 inches (6.1 cm and 7.62 cm). Such a thickness will lend itself to a manageable weight for the buildings' construction and adequate support of the laminate layered shields, while still being able to offer sufficient blast and ballistics resistance.

For laminate fabrication, the layers of the laminate are placed into a vacuum bag which is subsequently evacuated to 29 inches of Mercury (0.97 atm), maintained 1-hour prior to and subsequently throughout the autoclaving cycle. The vacuum bag with its content was then placed in an autoclave and heated 2.5° F. (1.5° C.)/minute for 96 minutes to 240° F. (116° C.). At the same time, the pressure is increased 3.8 psi (26.2 kPa)/minute to 171 psig (1179 kPa) over 45 minutes. The 240° F. (116° C.) temperature is then held for 90 minutes at 171 psig (1179 kPa) and the laminate is bonded together. The flatness of the laminate is dependent on the laminate layers configuration. In some configurations the laminate may be bowed in the worst cases, forming a potato-chip like distortion. The laminate of the present invention is found to be produced in a more stable manner, and is thus unlikely to be curved after autoclaving. Once the laminate is cooled and the IGU installed, the polycarbonate laminate and the integrated IGU is edge-sealed to keep moisture from infiltrating into the exposed edges of the laminate structure. Moisture infiltration may result in delamination. The edge can be sealed with for example Silicone 995 produced by Dow Corning or a multilayer polyurethane edge seal.

The polycarbonate laminate with the integrated IGU may fit within a frame, which substantially surrounds the laminate. There may also be an adhesive between the frame and the laminate to assist in securing the laminate to the frame and weatherizing the assembly. Framed laminates may fit into an array, supported by a steel structure to form an exterior curtain wall of a building. Horizontal and vertical steel support beams may be spaced, such that the frames of each framed laminate can be attached directly to the support beams. The framed laminates may then be each installed, or removed, independent of the other framed laminates adjacent to it. One advantage of this configuration is that if one laminate is damaged, it may be replaced without removing or disturbing the surrounding laminates, and also any damage to a laminate would likely not affect any adjacent laminates.

Figure 1:
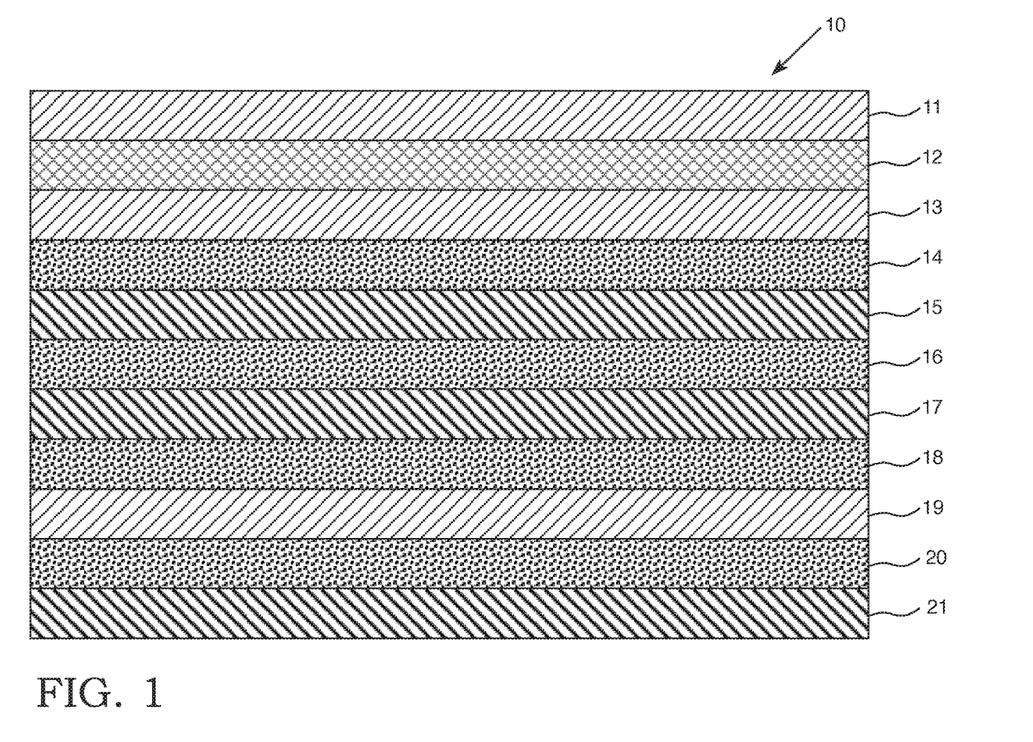
FIG. 1 shows a schematic of multiple layers that constitute a security polycarbonate laminate and insulated glazing unit.

FIG. 1 is a schematic representation of the layers that does not indicate any relative thicknesses of each layer. In one embodiment laminate 10 comprises glass layer 11, insulation layer 12, glass layer 13, thermoplastic polyurethane layer 14, polycarbonate layer 15, thermoplastic polyurethane layer 16, polycarbonate layer 17, thermoplastic polyurethane layer 18, glass layer 19, thermoplastic polyurethane layer 20 and polycarbonate layer 21.

Figure 2:
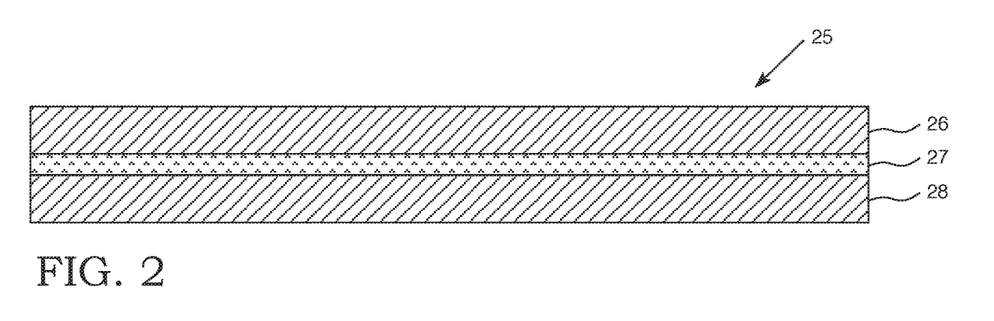

FIG. 2 shows another embodiment of the outer layers of a laminate, which in place of just one exterior glass layer, the first three layers 25 of a laminate include glass layer 26, signal defense layer 27, and glass layer 28.

Figure 3:
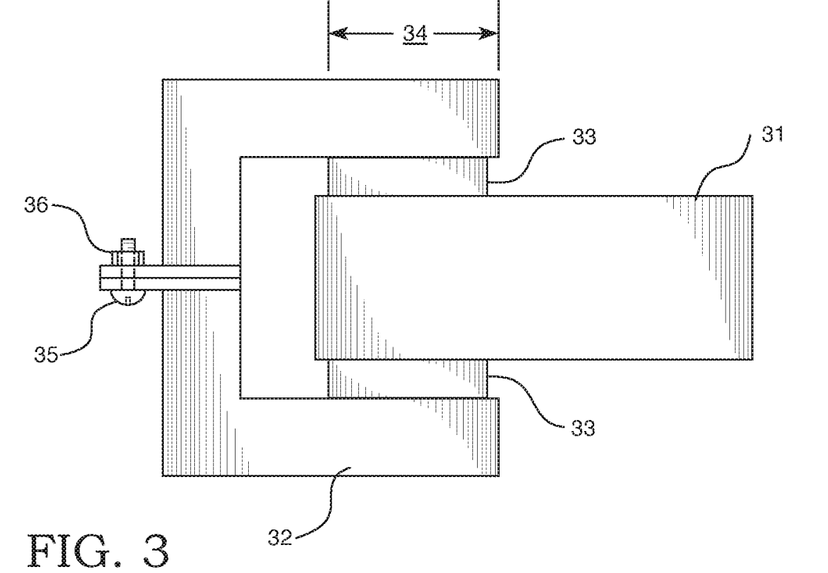
FIG. 3 shows a cross section of a polycarbonate laminate and integrated insulated glazing unit, with framing.

FIG. 3 shows a cross section of frame 32 holding a portion of laminate 31. Adhesive 33 is placed in between where frame 32 and laminate 31 would contact each other. In addition, frame 32 is placed along laminate 31 in pieces, and then frame 32 is bolted together using bolt 35 and nut 36, to secure and support laminate 31 in position.

Figure 4:
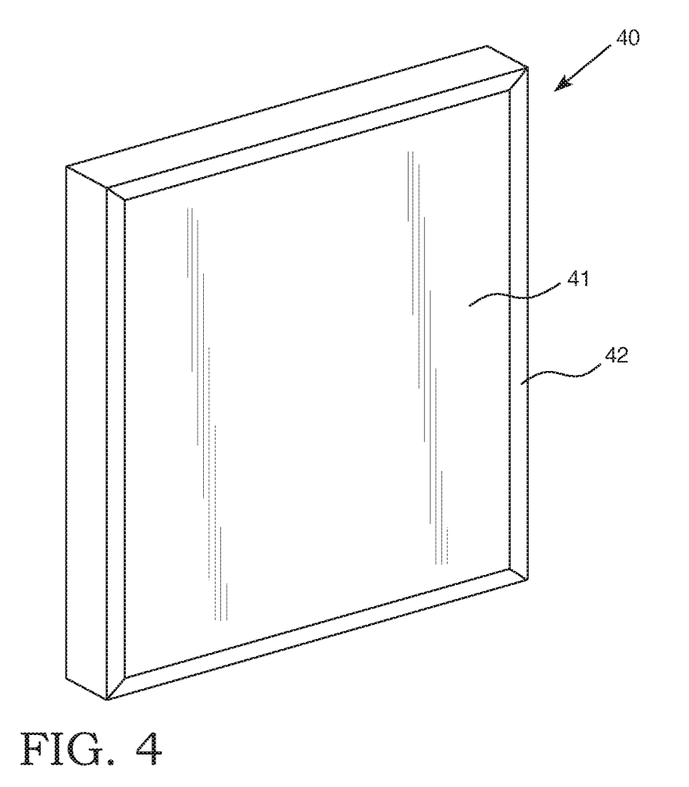
FIG. 4 shows a perspective view of a framed polycarbonate laminate and integrated insulated glazing unit.

FIG. 4 shows framed laminate 40, including frame 42 and laminate 41.

EXAMPLES

Several different laminates were created, and tested through computer modeling for their ability to meet blast requirements, as well as ability to withstand outside ambient cold and warm temperatures. Computer modeling was validated by shock tube and actual open-arena blast testing of polycarbonate laminates, and the data from these tests were used to develop, refine and validate the computer models. The validated models were then applied to laminate structures to determine whether the laminate structures were suitable for blast resistant laminates. For model tests to be successful, the laminate was required to remain engaged in the frame during and after a simulated blast event. The ability for the laminate to remain in the frame was dependent on frame bite (laminate edge engagement of the frame), and the magnitude of the blast. It was found that a frame bite of 0.75 inches (1.9 cm) to 3 inches (7.6 cm) was preferred, with 1 inch (2.5 cm) to 3.0 inches (5.1 cm) being most preferred.

Each of the IGU layers described below included a glass layer, an insulating layer of argon, and a second glass layer. The magnitude of the blast that the building was required to withstand was in excess of 30-psig (207 kPa) peak. To meet blast specification, the laminate must remain in the frame during and after the blast event. High blast conditions were used to model the following laminate structures:

It should also be noted that some laminate configurations produce laminate products which were not flat (that have a potato-chip appearance) after autoclaving. These severely warped laminates were rejected as unusable in building applications.

Example 1

IGU-TPU-PC-TPU-PC-TPU-PC-TPU-PC

The laminate did not meet the blast requirement, even when the frame bite was 2 inches (5.1 cm). In addition, the PC end of the laminate was found to be curved after bonding in the autoclave.

Example 2

IGU-TPU-PC-TPU-PC-TPU-PC

This laminate failed for the same reasons as example 1.

Example 3

IGU-TPU-Glass-TPU-PC-TPU-PC-TPU-PC

This laminate was also found to be curved after bonding in the autoclave. In addition, there was a degree of strain that was detected in the TPU layer between the two glass layers, such that the layers may delaminate (i.e., peel away from one another over time).

Example 4

IGU-TPU-Glass-TPU-PC-TPU-PC

This laminate failed for the same reasons as in example 3.

Example 5

IGU-TPU-Glass-TPU-PC-TPU-PC-TPU-PC-TPU-PC

This laminate failed for the same reasons as the ones given in example 3. In addition, the glass layer was found to touch the IGU layer at −20° C., which indicates high stresses and more likelihood of delamination (i.e., the layers peeling away from one another).

Example 6

IGU-TPU-Glass-TPU-Glass-TPU-PC-TPU-PC

This laminate failed for the same reasons as in example 5.

Example 7

IGU-TPU-PC-TPU-Glass-TPU-PC-TPU-Glass-TPU-PC

In this example, the inner glass layer was found to touch the IGU layer at −20° C., indicates high stresses and more likelihood of delamination (i.e., the layers peeling away from one another).

Example 8

IGU-TPU-PC-TPU-PC-TPU-Glass-TPU-PC

In this example, the laminate was found to retain its shape following the autoclave, as well as through cold and warm temperature cycles. Furthermore, the laminate passed the blast test, having a frame bite of 2 inches (5.1 cm) frame bite. This was also found to be true when the IGU configuration was glass-signal defense layer-glass-insulating argon layer-glass.

The following preferred embodiments of the present invention are summarized:

Item 1. A laminate comprising nine layers, in the following order:
(i) an insulated glazing unit;
(ii) a thermoplastic polyurethane;
(iii) a polycarbonate;
(iv) a thermoplastic polyurethane;
(v) a polycarbonate;
(vi) a thermoplastic polyurethane;
(vii) a glass;
(viii) a thermoplastic polyurethane; and
(ix) a polycarbonate.

Item 2. The laminate of Item 1, wherein the insulated glazing unit is comprised of a glass layer, an insulating layer, and a second glass layer.

Item 3. The laminate of Item 2, wherein the insulating layer comprises air, nitrogen or argon.

Item 4. The laminate of Items 2 or 3, wherein the insulating layer comprises gas at a pressure lower than atmospheric pressure.

Item 5. The laminate of Item 1, wherein the insulated glazing unit is comprised of a glass layer, a signal defense layer, a second glass layer, an insulating layer, and a third glass layer.

Item 6. The laminate of Item 5, wherein the insulating layer comprises air, nitrogen or argon.

Item 7. The laminate of Items 5 or 6, wherein the-insulating layer comprises gas at a pressure lower than atmospheric pressure.

Item 8. The laminate of any of the preceding items, wherein the thermoplastic polyurethane layers are about 0.025 inches (0.635 mm) to about 0.125 inches (3.175 mm) in thickness.

Item 9. The laminate of any of the preceding items, wherein the polycarbonate layers are about 0.125 inches (3.175 mm) to about 0.5 inches (12.7 mm) in thickness.

Item 10. The laminate of any of the preceding items, wherein the glass layer is about 0.25 inches (6.35 mm) to about 0.375 inches (9.53 mm) in thickness.

Item 11. The laminate of any of the preceding items, wherein the polycarbonate has a molecular weight of 10,000 g/mol-200,000 g/mol.

Item 12. The laminate of Item 11, wherein the polycarbonate has a molecular weight of 20,000 g/mol-80,000 g/mol.

Item 13. The laminate of Item 12, wherein the polycarbonate has a molecular weight of 30,000 g/mol-32,000 g/mol.

Item 14. The laminate of any of the preceding items, wherein the thickness of the laminate is between 2 and 4 inches (5.08 cm-10.16 cm).

Item 15. The laminate of Item 14, wherein the thickness of the laminate is between 2.4 and 3 inches (6.1 cm and 7.62 cm).

Item 16. A framed laminate, comprising a frame and the laminate of any of the preceding items, wherein the frame substantially surrounds the laminate.

Item 17. The framed laminate of Item 16, wherein the frame overlaps the laminate in a frame bite, and wherein the frame bite is 0.75 inches (1.9 cm) to 3 inches (7.6 cm).

Item 18. The framed laminate of Item 17, wherein the frame bite is 1 inch (2.5 cm) to 2 inches (5.1 cm).

Item 19. The framed laminate of items 16-18, further comprising an adhesive disposed in between the frame and the laminate.

Item 20. An array of two or more framed laminates of items 16-19
comprising a first framed laminate and a second framed laminate, wherein the first framed laminate is adjacent to the second framed laminate, and wherein the first framed laminate may be removed without removing the second framed laminate.

What is claimed is:

1. A laminate comprising nine layers, in the following order:
(i) an insulated glazing unit;
(ii) a thermoplastic polyurethane;
(iii) a polycarbonate;
(iv) a thermoplastic polyurethane;
(v) a polycarbonate;
(vi) a thermoplastic polyurethane;
(vii) a glass;
(viii) a thermoplastic polyurethane; and
(ix) a polycarbonate.

2. The laminate of claim 1, wherein the insulated glazing unit is comprised of a glass layer, an insulating layer, and a second glass layer.

3. The laminate of claim 2, wherein the insulating layer comprises air, nitrogen or argon.

4. The laminate of claim 2, wherein the insulating layer comprises gas at a pressure lower than atmospheric pressure.

5. The laminate of claim 1, wherein the insulated glazing unit is comprised of a glass layer, a signal defense layer, a second glass layer, an insulating layer, and a third glass layer.

6. The laminate of claim 5, wherein the insulating layer comprises air, nitrogen or argon.

7. The laminate of claim 5, wherein the insulating the insulating layer comprises gas at a pressure lower than atmospheric pressure.

8. The laminate of claim 1, wherein the thermoplastic polyurethane layers are about 0.025 inches (0.635 mm) to about 0.125 inches (3.175 mm) in thickness.

9. The laminate of claim 1, wherein the polycarbonate layers are about 0.125 inches (3.175 mm) to about 0.5 inches (12.7 mm) in thickness.

10. The laminate of claim 1, wherein the glass layer is about 0.25 inches (6.35 mm) to about 0.375 inches (9.53 mm) in thickness.

11. The laminate of claim 1, wherein the polycarbonate has a molecular weight of 10,000 g/mol 200,000 g/mol.

12. The laminate of claim 11, wherein the polycarbonate has a molecular weight of 20,000 g/mol 80,000 g/mol.

13. The laminate of claim 12, wherein the polycarbonate has a molecular weight of 30,000 g/mol-32,000 g/mol.

14. The laminate of claim 1, wherein the thickness of the laminate is between 2 and 4 inches (5.08 cm-10.16 cm).

15. The laminate of claim 14, wherein the thickness of the laminate is between 2.4 and 3 inches (6.1 cm and 7.62 cm).

16. A framed laminate, comprising a frame and the laminate of claim 1, wherein the frame substantially surrounds the laminate.

17. The framed laminate of claim 16, wherein the frame overlaps the laminate in a frame bite, and wherein the frame bite is 0.75 inches (1.9 cm) to 3 inches (7.6 cm).

18. The framed laminate of claim 17, wherein the frame bite is 1 inch (2.5 cm) to 2 inches (5.1 cm).

19. The framed laminate of claim 16, further comprising an adhesive disposed in between the frame and the laminate.

20. An array of two or more framed laminates of claim 16 comprising a first framed laminate and a second framed laminate, wherein the first framed laminate is adjacent to the second framed laminate, and wherein the first framed laminate may be removed without removing the second framed laminate.

* * * * *